[12] United States Patent  
Stephens

(10) Patent No.: US 6,775,915 B2  
(45) Date of Patent: Aug. 17, 2004

(54) METHOD AND DEVICE FOR DETERMINING ADEQUACY OF SPACE FOR TELEVISION SETS

(75) Inventor: Robert Stephens, Glen Alen, VA (US)

(73) Assignee: Circuit City Stores, Inc., Richmond, VA (US)

( * ) Notice: Subject to any disclaimer, the term of this patent is extended or adjusted under 35 U.S.C. 154(b) by 0 days.

(21) Appl. No.: 10/216,805

(22) Filed: Aug. 13, 2002

(65) Prior Publication Data

US 2004/0031165 A1 Feb. 19, 2004

(51) Int. Cl.[7] ............................... G01B 3/14; G09F 1/08
(52) U.S. Cl. .......................... 33/562; 33/1 B; 40/539; 186/36
(58) Field of Search .................... 33/562, 563, 566, 33/1 B, 1 G; 40/538, 539; 186/36, 52, 53; 206/576, 320, 459.5; 428/12, 126

(56) References Cited

U.S. PATENT DOCUMENTS

| 1,723,944 | A | * | 8/1929 | Marsh ......................... 248/174 |
| 1,853,615 | A | * | 4/1932 | Howard ....................... 40/539 |
| 2,499,859 | A | | 3/1950 | Halter |
| 2,810,474 | A | | 10/1957 | Essick |
| 2,827,955 | A | | 3/1958 | Hurley |
| 2,927,381 | A | * | 3/1960 | Renner ....................... 434/433 |
| 3,480,196 | A | * | 11/1969 | Simas ......................... 206/598 |
| 4,398,212 | A | * | 8/1983 | Serry et al. .................... 348/61 |
| 4,519,318 | A | | 5/1985 | Weldon-Ming |
| 4,759,520 | A | | 7/1988 | Levine |
| 5,138,462 | A | * | 8/1992 | Skovgaard .................. 348/836 |
| 5,195,249 | A | | 3/1993 | Jackson |
| 5,259,505 | A | * | 11/1993 | Sobel .......................... 206/509 |
| 5,265,848 | A | * | 11/1993 | Michaud et al. ............... 256/26 |
| 5,285,954 | A | * | 2/1994 | Goglio ................... 229/125.14 |
| 5,385,293 | A | * | 1/1995 | Hirota et al. ................ 229/122 |
| 5,473,966 | A | | 12/1995 | Cordon |
| 5,474,185 | A | * | 12/1995 | Franke ........................ 206/586 |
| 5,728,478 | A | | 3/1998 | Wilson et al. |
| 5,775,494 | A | * | 7/1998 | Taplin ...................... 206/308.2 |
| 5,887,388 | A | | 3/1999 | Hempel et al. |
| 5,904,410 | A | | 5/1999 | Davies |
| 6,085,431 | A | | 7/2000 | Schairbaum |
| 6,155,325 | A | | 12/2000 | Schirer |
| 6,553,683 | B1 | * | 4/2003 | Klass et al. .................... 33/562 |

OTHER PUBLICATIONS www.boxpros.com/television.htm, "Simulated Electronics by Box Props(TM) " as of Dec. 2000, Source — Internet Archive Wayback Machine.*

* cited by examiner

Primary Examiner—Christopher W. Fulton  
Assistant Examiner—R. Alexander Smith  
(74) Attorney, Agent, or Firm—Banner & Witcoff, Ltd.

(57) ABSTRACT

An article for determining the adequacy of space for a television set comprises a foldable generally rigid body, such as cardboard, having dimensions approximately equal to those of the television set. The article includes indicia indicating the diagonal screen size or other dimensions of the television set and/or identifying television model(s) having the represented dimensions. The article can be dispensed to individuals who wish to make determinations of the availability or suitability of space in a particular location prior to taking possession of the television set. Several articles of different dimensions can be provided, e.g., in a retail electronics store, wherein the dimensions of the several articles correspond to the dimensions of several television models that are available.

19 Claims, 3 Drawing Sheets

METHOD AND DEVICE FOR DETERMINING ADEQUACY OF SPACE FOR TELEVISION SETS

FIELD OF THE INVENTION

The present invention relates to sizing techniques and, more particularly, to methods and devices for ascertaining the availability of space for television sets.

BACKGROUND OF THE INVENTION

The decade of American economic prosperity leading up to the turn of the twenty-first century brought with it a visible trend in "super-sizing" of many consumer products. On the roadways, for instance, the sport utility vehicle (SUV) became the vehicle of choice for many motorists, while the size of some SUV models approached the gigantic. Within residential homes, television sets having larger and larger screen sizes became increasingly popular. Many television models currently offered for sale have diagonal screen sizes of 48 inches and greater.

One of the problems that has been experienced by some users of large-screen television sets is that, prior to taking possession of the television set, the individual miscalculates the availability of space within an interior room or within existing cabinetry intended to house the television set. The voluminous, open spaces typical of retail electronics stores can contribute to an individual underestimating the actual dimensions of a television set and thus the amount of space needed to house the set. Even when an individual estimates the availability of space in advance of a purchase based on the television set's diagonal screen size, the overall dimensions of the television unit (which may include, for example, a custom-designed stand or cabinet) may be somewhat greater.

In the absence of an adequate advance sizing determination, the user generally needs to first transport the television set to the desired location, and then unpack the set from its packaging before being able to ascertain whether a particular interior room or cabinetry has adequate space for the set. When the user discovers that insufficient space exists, he or she often is left with no choice but to return the set to the retailer. This delivery and return process can be a frustrating and burdensome experience for the user, particularly given the weight and bulkiness of many large-screen television sets. In addition, the high frequency of returns of large-screen television sets has proven to be a burden to retailers.

BRIEF SUMMARY OF THE INVENTION

The present invention, according to one aspect, is directed to an article for assisting a user in determining whether sufficient space exists in a desired location to accommodate a television set of particular dimensions. The article comprises a foldable generally rigid body having a height, a width, and a depth. A front portion of the rigid body has at least one preformed fold line traversing the front portion. The height and width of the rigid body are approximately equal to the corresponding height and width of a television set having a particular diagonal screen size. The rigid body has indicia indicating the diagonal screen size or other dimensions of the television set and/or identifying a television model having the aforementioned dimensions.

Another aspect of the invention is directed to a method of assisting a user in the selection of a television set in a retail electronics store. The method comprises providing in the retail store a foldable generally rigid body having a height, a width, and a depth. A front portion of the rigid body has at least one preformed fold line traversing the front portion. The height and width of the rigid body are approximately equal to the corresponding height and width of a television set having a particular diagonal screen size. The rigid body has indicia indicating the diagonal screen size or other dimensions of the television set and/or identifying a television model having the aforementioned dimensions.

Yet another aspect of the invention is directed to a kit for assisting a user in determining whether sufficient space exists in a desired location to accommodate a television set of particular dimensions. The kit comprises a foldable generally rigid body having a height, a width, and a depth, wherein at least the height and width of the rigid body are approximately equal to the corresponding height and width of a television set having a particular diagonal screen size. The kit also includes a container for storing the rigid body in a folded position. The container has indicia indicating the diagonal screen size or identifying a television set having the aforementioned dimensions, and instructions for unfolding and using the rigid body.

In a preferred practice of the invention, a supply of two or more articles that correspond in dimensions to differently-sized television sets, are provided in a retail electronics store. When an individual is considering acquiring a particular television set(s), a sales associate can distribute to the user the article(s) of appropriate dimensions. To assist the sales associate in selecting the appropriate article, the articles and/or containers for the articles are provided with indicia indicating the television's diagonal screen size (e.g., 47", 57", 65", etc.) or other dimensions, and/or the television model(s) whose dimensions are represented by the article. The user can unfold and place the article(s) in the intended location for the television set to quickly determine whether the location provides sufficient space to accommodate the desired television set.

The present invention helps to alleviate consumer frustration by providing a simple and easy-to-use article for making an advance determination of whether a particular space will provide sufficient room for a particular television set model or a particularly sized television set. The present invention avoids the need for a user to first take possession of the television, transport the television to the desired location, unpack the television, and then place in the desired location before making a determination of whether sufficient space exists.

By enabling users to make advance determinations of the availability of space for a new television set, it is contemplated that fewer returns of large-screen televisions will be made. This should make the purchasing or leasing experience more enjoyable for the customer, help alleviate the burden imposed on the retailer or leaser associated with processing returns, and avoid any potential expense associated with returns. Another benefit of the present invention is that a user may discover, in advance of taking possession of the television set, that a larger television set can be accommodated than was originally thought. Had the user taken possession of the smaller television set, the user may not have been willing to go through the hassle of exchanging the set for a larger one. However, had the user known in advance that additional space was available, he or she may have selected a larger television set instead. Thus, in addition to reducing the instances of returns resulting from inadequacy of space, the present invention also is useful in assisting a user in selecting a television set most appropriately sized for a particular location.

In addition to assisting retail television purchasers, the article of the invention also can be used in a variety of other environments. For example, the article can be used by hotel operators or designers in the selection of television sets for hotel rooms. As another example, the article can be used in rental facilities to enable rental customers to make advance sizing determinations prior to renting or leasing a television. In general, the article of the invention may be used in any situation where it may be desirable to measure the amount of space available for a television set in a particular location.

BRIEF DESCRIPTION OF THE DRAWINGS

The present invention will now be described in more detail with reference to preferred embodiments of the invention, given only by way of example, and illustrated in the accompanying drawings in which.

DETAILED DESCRIPTION OF THE INVENTION

Figure 1A:
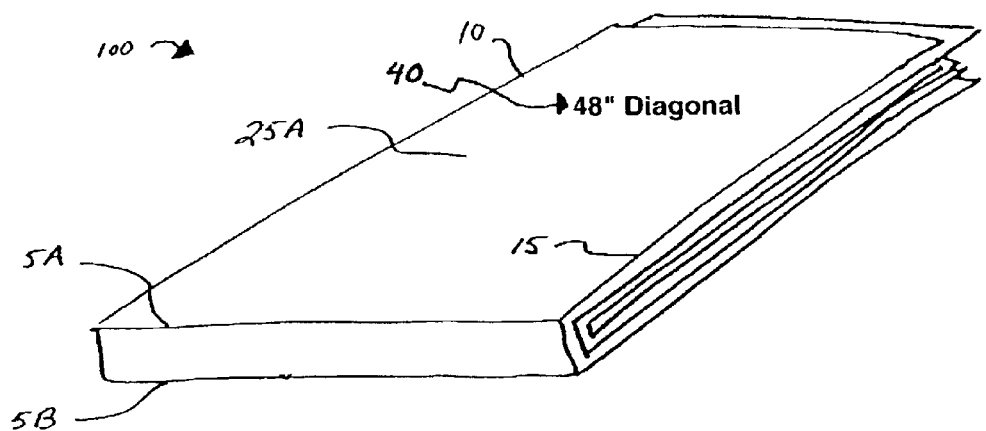
FIG. 1A is a perspective view of an article for determining the adequacy of space for a television set in accordance with one embodiment of the invention, with the article in the folded position for storage or transportation.

The article of the present invention, which is useful in determining the adequacy of space for a television set, can be constructed from any material capable of forming a generally rigid body, e.g., a body that can rest on a floor, shelf, or other solid object and which sufficiently maintains its dimensions to approximate the dimensions of a television set. Preferably, inexpensive, lightweight materials such as cardboard are used to prepare a foldable, free-standing rigid body, which can be easily disposed of, recycled, or returned to the retail electronics store for reuse.

To the extent that the article can be folded, disassembled, or otherwise compacted (e.g., for transportation or storage), references herein to the article's dimensions, unless otherwise clear from their context, refer to the dimensions that the article exhibits while it is in the configuration adapted for approximating the dimensions of a television set. In the embodiment illustrated in FIG. 1B, for example, a cardboard piece 100 is folded at right angles along first 10 and second 20 vertical score lines to form side portions 40A, 40B, such that the article is configured in a "U" shape having predetermined height h, width w, and depth d dimensions.

The article contains indicia to identify the television set(s) to which the dimensions of the article correspond in size. The indicia on the article can be in a number of different forms. For example, the indicia can be alpha-numeric characters specifying the diagonal screen size of the television set (e.g., 47", 57", 65", etc.); alpha-numeric characters specifying other dimensions of the television unit (e.g., 50"h×45"w×24"d); alpha-numeric characters, symbols, or marks identifying the manufacturer and/or model of the television set, or any combination thereof. Because television set sizes most often are designated by diagonal screen size, it is preferred that the indicia on the article indicates the diagonal screen size of the television, as illustrated in the drawings. The indicia may indicate a range of diagonal screen sizes for which the article is useful. The article also may include other indicia, e.g., for aesthetic or advertising purposes, such as the logo of the retailer and/or television manufacturer, a photograph or drawing of a television set, and the like. In addition, the article may include printed instructions to assist the user in setting up and using the article for making sizing determinations.

Many large screen television sets are equipped with a custom-designed stand or cabinet that comes together with the purchase of the television or is sold as an optional accessory. Preferably, the dimensions of the article are inclusive of any custom-designed stand or cabinet, i.e., the dimensions of the article represent those of the television/ stand or television/cabinet combination. When a television can be used with or without an optional stand or cabinet, the article can be provided with a perforation, score line, or equivalent structure to enable the user to fold, separate, or otherwise reconfigure the article such that the dimensions of the reconfigured article represent those of the television without the optional stand or cabinet.

The article of the invention can be used in connection with any type of consumer or personal transaction in which it may be desirable to make an advance determination of the availability or suitability of space for a television set in a particular location. The terms "purchase," "lease," "acquire," "take possession of," and similar terms are used herein merely as examples of transactions in which a television set may be transferred from some location to a point of use. Non-limiting examples of contexts in which the article may be used include retail sales, bulk sales (e.g., for hotels or the like), rentals, leasing, and non-commercial transactions such as lending.

Figure 1B:
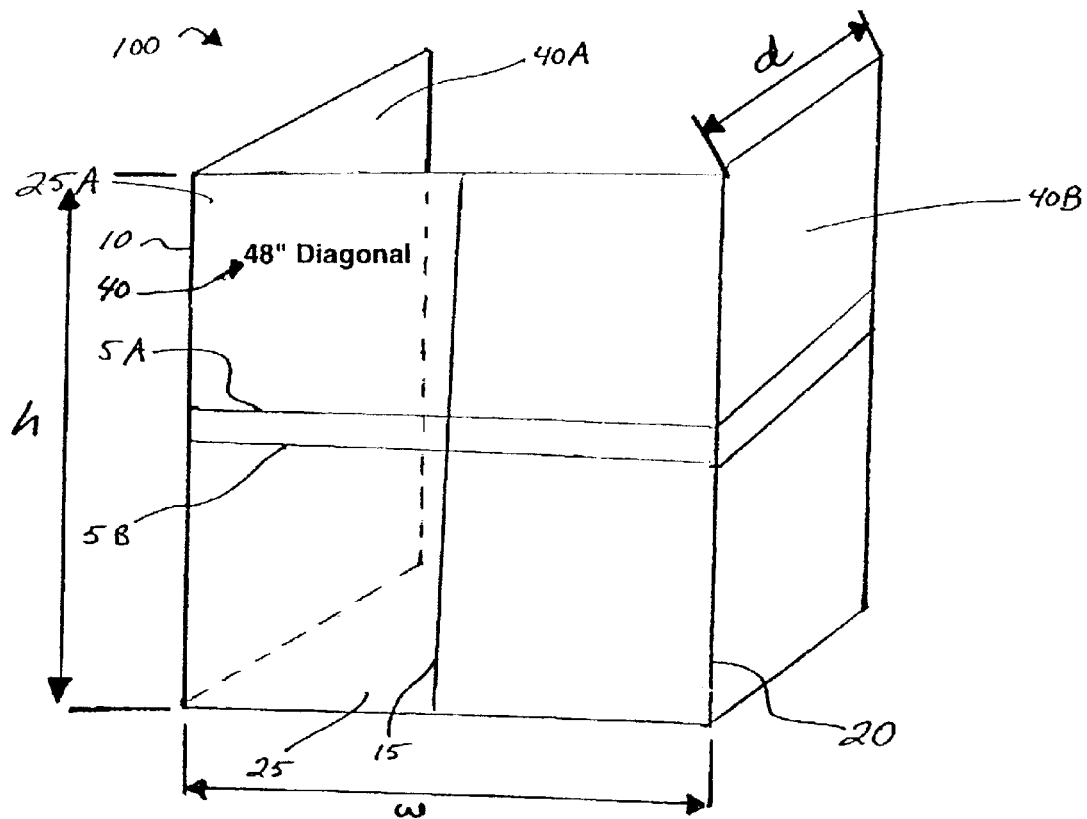
FIG. 1B is a perspective view of the article of FIG. 1A in the unfolded (in-use) position.

FIGS. 1A and 1B illustrate an article constructed from cardboard in accordance with one embodiment of the present invention. FIG. 1A illustrates the article in the folded position, e.g., for storage and transportation. FIG. 1B illustrates the article in the unfolded position, in which the article can be used for determining whether adequate space is available for a particularly sized television set. The article is constructed from a rigid body formed from a rectangular piece of cardboard 100. In the unfolded position shown in FIG. 1B, the article has a front portion 25 and two side portions 40A, 40B that together form a "U" shape. The top portion and the back portion of the article are open. The side portions 40A, 40B are set up by folding the cardboard 100 along first and second vertical score lines 10, 20 at right angles with respect to the front portion 25. The front portion 25 has a width w and a height h that are approximately equal to the height and width of a television set having a particular diagonal screen size. The side portions 40A, 40B each have a depth d that is approximately equal to the depth of the television set. The embodiment shown in FIGS. 1A and 1B depicts an article for use with a television having a 48" diagonal screen size and which includes a custom-designed cabinet for the television.

Additional score lines are provided for folding the cardboard 100 into the folded position, as shown in FIG. 1A, adapted for convenient storage and transportation of the article. The front portion 25 has at least one preformed fold line traversing the front portion 25. For example, in the embodiment illustrated in the drawings, a vertical score line 15 is formed at the vertical centerline of the cardboard 100 and two horizontal score lines 5A, 5B are formed on opposing sides of the horizontal centerline of the cardboard 100, approximately 2 to 3 inches apart to form an edge or spine portion as the article is folded, as described below.

Figure 2A:
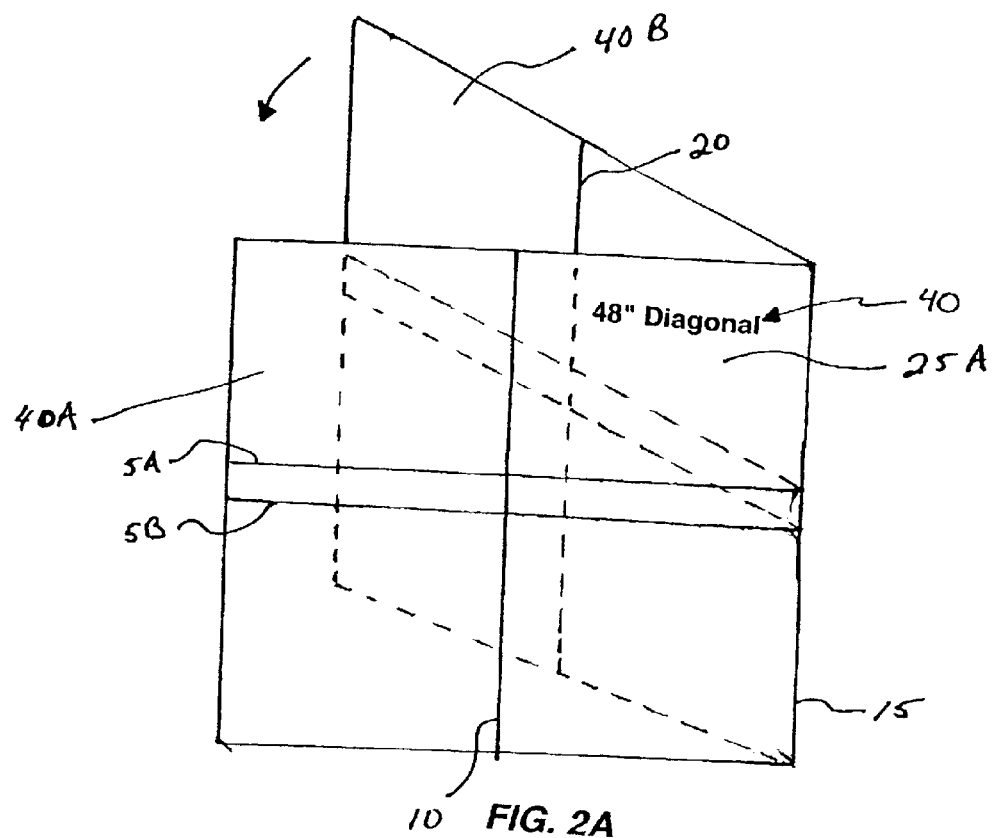
FIGS. 2A–2B illustrate the steps of folding the article shown in FIG. 1B from the illustrated unfolded position to the folded position shown in FIG. 1A.
Figure 2B:
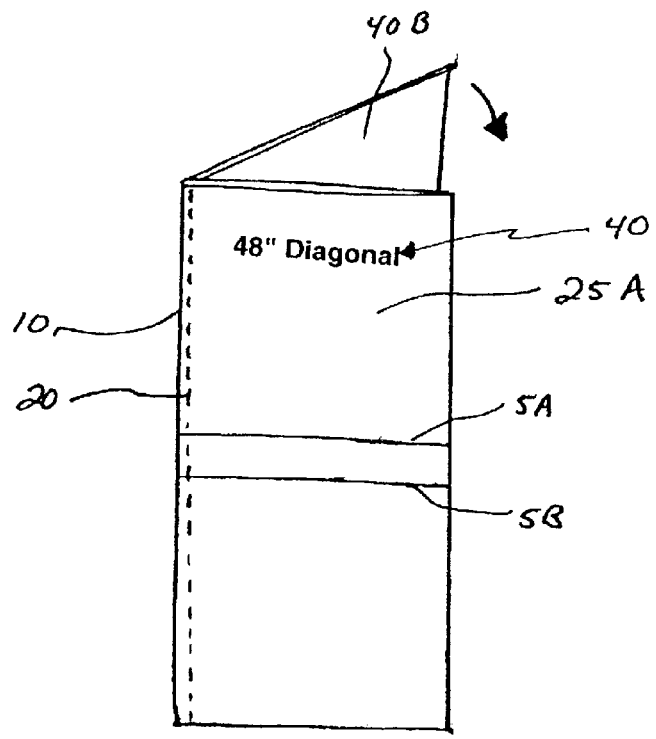

The article can be folded from the unfolded position (FIG. 1B) to the folded position (FIG. 1A) by first opening the side portions 40A, 40B outwardly so that the cardboard 100 is in a planar configuration. Next, the cardboard 100 is folded in half via center vertical score line 15, keeping the front portion 25 and indicia 40 thereon on the outside (i.e., keeping the indicia 40 visible), as illustrated in FIG. 2A. Thereafter, the cardboard 100 is folded in half again via vertical score lines 10, 20, once again keeping the indicia 40 visible, as illustrated in FIG. 2B. Finally, the article is folded in half via the horizontal score lines 5A, 5B into the folded position illustrated in FIG. 1A.

The upper left hand quadrant 25A of the front portion 25 of the article in the unfolded position (FIG. 1B) forms the top side of the folded article (FIG. 1A). Thus, the indicia 40 indicating the diagonal screen size (48" Diagonal) appears on the top portion of the folded article illustrated in FIG. 1A. This configuration enables a sales representative or user to identify the dimensions while the article is in the folded position. Indicia alternatively or additionally can be applied to the "spine" portion of the article, i.e., between the horizontal score lines 5A, 5B, so that it is visible when a plurality of the folded articles are stacked.

A variety of techniques can be used to form preformed fold lines on the article. Preferably, the preformed fold lines are formed by scoring in accordance with techniques well known to persons skilled in the art. Alternative techniques, such as perforating, may be used to permit folding of the cardboard piece along predetermined lines. Alternatively, the article can be constructed from plural pieces that interlock or otherwise are attachable using any suitable technique, such as tongue and groove connections. The dimensions of the illustrated article in the unfolded position (FIG. 1B) are approximately 48"h×43"w×22"d. In the folded position shown in FIG. 1A, the dimensions are approximately 2"h×23"w×23"d. Thus, in this configuration each of the width and depth dimensions of the folded article (23" each) is no more than about one half of the diagonal screen size (48"), while the height (thickness) of the folded article is no more than about 3 inches, depending of course on the thickness of the cardboard or other material used.

Figure 3:
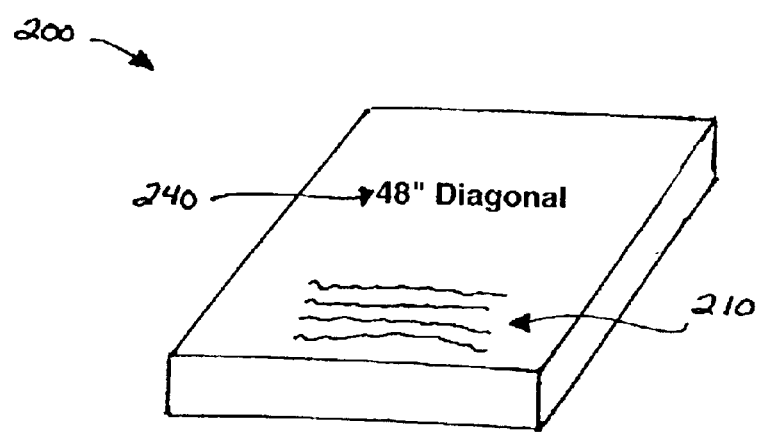
FIG. 3 is an illustration of a container for storing the article and which bears printed instructions for using the article in accordance with one embodiment of the present invention.

FIG. 3 illustrates a container 200 that can be used for storing the article in accordance with one embodiment of the invention. The container can be a cardboard box, for example, having dimensions suitable for storing the article while in the folded position shown in FIG. 1A. While a cardboard box is illustrated in FIG. 3, other types of containers can be used, such as a paper or plastic bag or the like. An outside surface of the container 200 has indicia 240 to identify the television set(s) to which the dimensions of the enclosed article corresponds in size, as well as printed instructions 210 to assist the user in unfolding and using the article for making sizing determinations. The instructions 210 can be in a variety of different forms, such as printed (text) instructions, photographs or diagrams, or a combination thereof. The container may also include additional indicia, e.g., for aesthetic or advertising purposes. The indicia 240 can be applied to the top surface of the container 200, as shown in FIG. 3, and/or to one or more edge portions thereof such that the indicia 240 is visible when a plurality of containers are stacked.

In the practice of a preferred embodiment of the invention, supplies of the folded articles are provided in a retail electronics store. Preferably, supplies of two or more differently-sized articles corresponding in dimensions to differently-sized television sets offered for sale (e.g., diagonal screen sizes of 47", 57", 65", etc.) are provided. When in the folded position, as illustrated in FIG. 1A, the articles are substantially flat such that they can be conveniently stacked in the retail electronics store. Preferably, the articles are grouped according to their dimensions so that the appropriate article(s) can be quickly identified by the sales associate or customer. If desired, the articles can be stacked and displayed in the area of the store that televisions are displayed to enable customers to take the articles without the assistance of a sales associate. When a display is made available to customers, it may be desirable to provide a sign or the like identifying the function of the article and/or providing instructions for its use.

When an individual is interested in acquiring a particular television set but unsure whether sufficient space exists in the desired location for the television set, a sales associate can distribute to the individual an article whose dimensions correspond to those of the television set of interest. The sales associate may recommend that the individual also take a second article having different dimensions (e.g., corresponding in dimensions to the next largest television size available). In this situation, the individual can first determine whether the desired television set will properly fit in the intended location and, if not, then determine whether the alternative size will fit. Similarly, a sales associate may provide an individual with two or more articles of different sizes when the individual is unsure of the most appropriately sized television for a particular cabinet or space.

The user can transport the article from the retail electronics store (or other source) to the home or other intended location for the television set, unfold the article, and simply place the unfolded article in the desired location to quickly determine whether the location provides sufficient space to accommodate the television set. This exercise may confirm that the location provides appropriate space for desired television set. If the exercise reveals that too little or too much room exists, it may be readily apparent to the user that a different television set (i.e., one that is somewhat smaller or somewhat larger) is the most appropriately sized. Otherwise, the user may repeat the sizing determination with one or more additional articles to assess the suitability of differently sized television sets.

The principles, preferred embodiments and modes of operation of the present invention have been described in the foregoing specification. The invention which is intended to be protected herein, however, is not to be construed as limited to the particular forms disclosed, since they are to be regarded as illustrative rather than restrictive. Variations and changes may be made by those skilled in the art without departing from the spirit of the invention.

What is claimed is:

1. An article for assisting a user in gauging and determining whether sufficient space exists in a desired location to accommodate a television set without the need of first transporting the television set to the desired location, the article comprising:

a foldable generally rigid body such that when unfolded into a gauging condition, said body has a front portion and two side portions, wherein said front portion is divided by at least one preformed fold line that traverses said front portion, and wherein each of said side portions is separated from said front portion by at least one vertical preformed fold line, said front portion and said two side portions together form a U shape having an unenclosed top and back;

wherein the perimeter of said front portion forms a gauging height and a gauging width and the perimeter of said side portions forms a gauging depth to determine whether sufficient space exists;

said generally rigid body including indicia directly related to said gauging height, said gauging width, and said gauging depth;

said indicia indicating a diagonal screen size of said television set having an approximately equal corresponding height, width and depth to said gauging height, gauging width, and gauging depth or said indicia identifying a television set having an approximately equal corresponding height, width and depth to said gauging height, gauging width and gauging depth.

2. The article of claim 1 wherein said foldable generally rigid body is a cardboard member.

3. The article of claim 2 wherein said at least one preformed fold line that traverses said front portion is horizontal and includes an additional horizontal preformed fold line and at least one additional vertical preformed fold line, and wherein said cardboard member is foldable and sufficiently thin such that when folded to a folded position the folded cardboard member has a height of about 3 inches or less, and a width and a depth that each are no more than about one half of said diagonal screen size.

4. The article of claim 3 wherein said cardboard member in said folded position is substantially flat such that a plurality of said folded cardboard members are stackable upon one another.

5. A method of assisting a user in the selection of a television set in a retail electronics store, the method comprising:

providing in said retail electronics store a first foldable generally rigid body which when unfolded into a gauging condition, said body has a front portion and two side portions, wherein said front portion is divided by at least one preformed fold line that traverses said front portion, and wherein each of said side portions is separated from said front portion by at least one vertical preformed fold line, said front portion and said two side portions together form a U shape having an unenclosed top and back;

wherein the perimeter of said front portion forms a gauging height and a gauging width and the perimeter of said side portions forms a gauging depth to determine whether sufficient space exists;

said first foldable generally rigid body including indicia directly related to said gauging height, said gauging width, and said gauging depth;

said indicia indicating a diagonal screen size of a first television set having an approximately equal corresponding height, width and depth to said gauging height, gauging width, and gauging depth or said indicia identifying a first television set having an approximately equal corresponding height, width and depth to said gauging height, gauging width and gauging depth; and distributing said first foldable rigid body to an individual to assist the individual in the selection of said first television set.

6. The method of claim 5 wherein said first generally rigid body is a first cardboard member.

7. The method of claim 6 wherein said at least one preformed fold line that traverses said front portion is horizontal and includes an additional horizontal preformed fold line and at least one additional vertical preformed fold line, and wherein said cardboard member is foldable and sufficiently thin such that when folded to a folded position the folded first cardboard member has a height of about 3 inches or less, and a width and a depth that each are no more than about one half of said first diagonal screen size.

8. The method of claim 7 wherein said first cardboard member in said folded position is substantially flat such that a plurality of said folded first cardboard members are stackable upon one another.

9. The method of claim 5 further comprising providing in said retail store a second foldable generally rigid body such that when unfolded into a gauging condition, said body has a front portion and two side portions, wherein said front portion is divided by at least one preformed fold line that traverses said front portion, and wherein each of said side portions is separated from said front portion by at least one vertical preformed fold line, said front portion and said two side portions together form a U shape having an unenclosed top and back;

wherein the perimeter of said front portion forms a gauging height and a gauging width and the perimeter of said side portions forms a gauging depth to determine whether sufficient space exists;

said second foldable generally rigid body including indicia directly related to said gauging height, said gauging width, and said gauging depth;

said indicia indicating a diagonal screen size of a second television set having an approximately equal corresponding height, width and depth to said gauging height, gauging width, and gauging depth or said indicia identifying a second television set having an approximately equal corresponding height, width and depth to said gauging height, gauging width and gauging depth.

10. The method of claim 9 wherein said second generally rigid body is a second cardboard member.

11. The method of claim 10 wherein said at least one preformed fold line that traverses said front portion is horizontal and includes an additional horizontal preformed fold line and at least one additional vertical preformed fold line, and wherein said cardboard member is foldable and sufficiently thin such that when folded to a folded position the folded second cardboard member has a height of about 3 inches or less, and a width and a depth that each are no more than about one half of said second diagonal screen size.

12. The method of claim 11 wherein the second cardboard member in said folded position is substantially flat such that a plurality of folded second cardboard members are stackable upon one another.

13. A method of assisting an individual in the selection of a television set in a retail electronics store in which a plurality of television set models are offered for sale, the method comprising:

providing in said retail electronics store a supply of first cardboard articles in a folded position, wherein each of said first cardboard articles comprises a foldable generally rigid body such that when unfolded into a gauging condition, said body has a front portion and two side portions, wherein said front portion is divided by at least one preformed fold line that traverses said front portion, and wherein each of said side portions is separated from said front portion by at least one vertical preformed fold line, said front portion and said two side portions together form a U shape having an unenclosed top and back;

wherein the perimeter of said front portion forms a gauging height and a gauging width and the perimeter of said side portions forms a gauging depth to determine whether sufficient space exists;

said generally rigid body including indicia directly related to said gauging height, said gauging width, and said gauging depth;

said indicia indicating a diagonal screen size of a first television set having an approximately equal corresponding height, width and depth to said gauging height, gauging width, and gauging depth or said indicia identifying a first television set having an approximately equal corresponding height, width and depth to said gauging height, gauging width and gauging depth;

providing in said retail electronics store a supply of second cardboard articles in a folded position, wherein each of said second cardboard articles comprises a foldable generally rigid body such that when unfolded into a gauging condition, said body has a front portion and two side portions, wherein said front portion is divided by at least one preformed fold line that traverses said front portion, and wherein each of said side portions is separated from said front portion by at least one vertical preformed fold line, said front portion and said two side portions together form a U shape having an unenclosed top and back;

wherein the perimeter of said front portion forms a gauging height and a gauging width and the perimeter of said side portions forms a gauging depth to determine whether sufficient space exists;

said generally rigid body including indicia directly related to said gauging height, said gauging width, and said gauging depth;

said indicia indicating a diagonal screen size of a second television set having an approximately equal corresponding height, width and depth to said gauging height, gauging width, and gauging depth or said indicia identifying a second television set having an approximately equal corresponding height, width and depth to said gauging height, gauging width and gauging depth; and distributing at least one of said first cardboard article and said second cardboard article to an individual to assist the individual in the selection of said first television set or said second television set.

14. The method of claim 13 further comprising distributing both of said first cardboard article and said second cardboard article to the individual.

15. A kit for assisting a user in determining whether sufficient space exists in a desired location to accommodate a television set of particular dimensions without the need of first transporting the television set to the desired location, the kit comprising:

a foldable generally rigid body such that when unfolded into a gauging condition, said body has a front portion and two side portions, wherein said front portion is divided by at least one preformed fold line that traverses said front portion, and wherein each of said side portions is separated from said front portion by at least one vertical preformed fold line, said front portion and said two side portions together form a U shape having an unenclosed top and back;

wherein the perimeter of said front portion forms a gauging height and a gauging width and the perimeter of said side portions forms a gauging depth to determine whether sufficient space exists; and a container for storing said foldable generally rigid body in a folded position, wherein said container has on an outside surface thereof indicia directly related to said gauging height, said gauging width, and said gauging depth;

said indicia indicating a diagonal screen size of said television set having an approximately equal corresponding height, width and depth to said gauging height, gauging width, and gauging depth or said indicia identifying a television set having an approximately equal corresponding height, width and depth to said gauging height, gauging width and gauging depth, and instructions for unfolding and using said foldable generally rigid body to determine whether sufficient space exists in a desired location to accommodate said television set.

16. The kit of claim 15 wherein said foldable generally rigid body is a cardboard member.

17. The kit of claim 16 wherein said at least one preformed fold line that traverses said front portion is horizontal and includes an additional horizontal preformed fold line and at least one additional vertical preformed fold line, and wherein said cardboard member is foldable and sufficiently thin such that when folded to a folded position the folded cardboard member has a height of about 3 inches or less, and a width and a depth that each are no more than about one half of said diagonal screen size.

18. The kit of claim 17 wherein said cardboard member comprises indicia indicating said first diagonal screen size or identifying a television set having said corresponding height and width.

19. A method of assisting a user in the selection of a television set in a retail electronics store, the method comprising:

providing in an unfolded position a foldable generally rigid body such that when unfolded into a gauging condition, said body has a front portion and two side portions, wherein said front portion is divided by at least two preformed fold lines that horizontally traverse said front portion, and wherein each of said side portions is separated from said front portion by at least one vertical preformed fold line, said front portion and said two side portions together form a U shape having an unenclosed top and back;

wherein the perimeter of said front portion forms a gauging height and a gauging width and the perimeter of said side portions forms a gauging depth to determine whether sufficient space exists;

said generally rigid body including indicia directly related to said gauging height, said gauging width, and said gauging depth;

said indicia indicating a diagonal screen size of said television set having an approximately equal corresponding height, width and depth to said gauging height, gauging width, and gauging depth or said indicia identifying a television set having an approximately equal corresponding height, width and depth to said gauging height, gauging width and gauging depth;

opening said two side portions outwardly so that the front portion and two side portions are in a planar configuration;

folding said generally rigid body in half via a third vertical preformed fold line;

folding said generally rigid body in half again via said at least two vertical preformed fold lines that separate said front portion and said side portions;

folding said generally rigid body in half via said at least two horizontal preformed fold lines, wherein said indicia is visible on an exterior surface of the generally rigid body so folded; and distributing said generally rigid body in said folded position to an individual to assist the individual in the selection of said television set.

* * * * *